United States Patent [19]

Lin et al.

[11] 4,197,228

[45] Apr. 8, 1980

[54] IMPREGNATING COMPOSITION

[75] Inventors: Kingso C. Lin; Donn R. Vermilion, both of Newark, Ohio

[73] Assignee: Owens-Corning Fiberglas Corporation, Toledo, Ohio

[21] Appl. No.: 892,632

[22] Filed: Apr. 3, 1978

Related U.S. Application Data

[63] Continuation-in-part of Ser. No. 787,810, Apr. 15, 1977, abandoned.

[51] Int. Cl.² .................................................. C08K 7/14
[52] U.S. Cl. ............................... 260/28.5 B; 428/251; 428/261; 428/273
[58] Field of Search ...................... 260/28.5 B, 879; 428/251, 261, 273

[56] References Cited

U.S. PATENT DOCUMENTS

| | | | |
|---|---|---|---|
| 3,567,671 | 3/1971 | Janetos et al. | 260/28.5 B |
| 3,888,805 | 6/1975 | Van Gils et al. | 260/29.7 |
| 3,895,163 | 7/1975 | Elmer | 428/261 |
| 3,896,253 | 7/1975 | Elmer | 428/251 |
| 3,930,095 | 10/1975 | Gils et al. | 526/265 |
| 3,955,024 | 5/1976 | Goldman et al. | 428/209 |
| 4,014,835 | 3/1977 | McCombs | 260/28.5 B |
| 4,040,999 | 8/1977 | Kalatus et al. | 260/29.3 |
| 4,060,658 | 11/1977 | Lin et al. | 428/378 |

*Primary Examiner*—V. P. Hoke
*Attorney, Agent, or Firm*—Ronald C. Hudgens; Philip R. Cloutier; James B. Wilkens

[57] ABSTRACT

An impregnating composition used in the treatment of glass fibers to provide a good bonding relationship between glass fibers and elastomeric materials in the manufacture of glass fiber reinforced elastomeric products formed of a resorcinol-aldehyde resin, a butadiene polymer, a wax and a copolymer of butadiene and vinyl pyridine.

8 Claims, No Drawings

IMPREGNATING COMPOSITION

The present application is a continuation-in-part of application Ser. No. 787,810, filed Apr. 15, 1977 now abandoned.

This invention relates to impregnating compositions for use in the treatment of glass fibers to facilitate the combination of glass fibers with elastomeric materials in the manufacture of glass fiber reinforced elastomeric products.

It is now well known to combine glass fibers with elastomeric materials in the manufacture of glass fiber-reinforced elastomeric products, such as driving belts, timing belts, pneumatic tires and the like. In the usual practice in the manufacture of glass fiber-reinforced elastomeric products, glass fibers are first coated with a thin film or size coating, usually as they are formed, whereby the size coating serves to impart to the individual glass fibers the desired lubricity and thereby protect the glass fiber filaments from destruction through mutual abrasion. After the glass fibers have been sized, they are gathered together to form cords, strands or yarns, generally referred to in the art as bundles, and subjected to impregnation with an elastomeric-compatible material. The impregnant formed of the elastomeric-compatible material serves to intertie the glass fiber bundles to the elastomeric material in which the glass fiber bundles are distributed as reinforcement. Thus, the impregnated bundles of glass fibers are dispersed in the elastomeric material, the latter constituting a continuous phase.

A great deal of research has been conducted in an effort to determine what sort of impregnating composition provides the best adhesion between the impregnated bundle and the elastomeric material forming the continuous phase. In U.S. Pat. No. 3,567,671, there is described an impregnating composition which has enjoyed considerable success as a tire cord impregnant. The composition there described is formulated of a resorcinol-aldehyde resin, a latex component, preferably a monocarboxylated butadiene-styrene resin, a microcrystalline paraffin wax and a butadiene-styrene-vinyl pyridine terpolymer.

The vinyl pyridine-butadiene-styrene terpolymer described in the foregoing patent is an interpolymer formed of 70% by weight butadiene, 15% by weight of styrene and 15% by weight vinyl pyridine. Similar terpolymers are described elsewhere in the prior art, such as U.S. Pat. No. 3,424,608.

A further improved impregnating composition embodying a butadiene-styrene-vinyl pyridine terpolymer is described in U.S. Pat. No. 3,787,224. The composition described in that patent is of the same type as described in U.S. Pat. No. 3,567,671, except that the butadiene-styrene copolymer component of U.S. Pat. No. 3,787,224 is a dicarboxylated butadiene-styrene resin. The butadiene-styrene resin employed in U.S. Pat. No. 3,567,671 is a mono-carboxylated resin. Again, the butadiene-styrene-vinyl pyridine terpolymer component described in U.S. Pat. No. 3,787,224 was the same type, containing 70% butadiene, 15% styrene and vinyl pyridine.

It has now been found that improved properties can be obtained by employing a butadiene-vinyl pyridine copolymer containing no styrene at all.

It is accordingly an object of the present invention to provide an impregnating composition for use in the treatment of glass fibers to promote the compatibility between glass fibers and elastomeric materials in the manufacture of glass fiber reinforced elastomeric products wherein the impregnant provides further improved properties.

It is a more specific object of the invention to provide a tire cord impregnant composition capable of attaining improved adhesion characteristics when used in the treatment of glass fibers for reinforcement of elastomeric materials.

The concepts of this invention reside in a tire cord impregnant consisting essentially of a stable aqueous dispersion of a resorcinol-aldehyde resin, a microcrystalline paraffin wax emulsion, a butadiene polymer containing more than 95% butadiene monomer and a copolymer formed of 70–95% by weight butadiene and 5–30% vinyl pyridine. It has been found, in accordance with the concepts of this invention, that the tire cord impregnating composition of the invention provides even better adhesion and performance characteristics when no styrene is present in the butadiene-vinyl pyridine copolymer, which consists essentially of a binary reaction mixture of the two monomers.

In the practice of the invention, the copolymer is made up of 80–95% by weight butadiene and 5–20% by weight vinyl pyridine.

The butadiene-vinyl pyridine copolymer can be prepared in accordance with conventional techniques. Such conventional methods are described in Chapter 10, entitled "Butadiene-Styrene Rubbers" of *Introduction to Rubber Technology*, Reinhold Publishing Corp., New York, 1959, edited by Maurice Morton. In addition, such terpolymers and copolymers can be obtained from commercial suppliers including Firestone Tire and Rubber Company and Goodyear Tire and Rubber Company. One such commercially available material is "SR-6600", a copolymer latex formed of 85% butadiene and 15% vinyl pyridine, manufactured by Firestone.

The resorcinol-aldehyde resin component employed in the composition of this invention is a resin of the sort described in U.S. Pat. No. 3,787,224. It is one preferably formed by reaction of resorcinol with a lower aliphatic aldehyde containing 1–3 carbon atoms (e.g., formaldehyde, acetaldehyde and propionaldehyde). Preferred resins are those formed by the condensation reaction of formaldehyde with resorcinol in a mole ratio of about 2 moles of resorcinol for each mole of formaldehyde. Such resins are commercially available from, for example, the Koppers Company under the trademark "Penacolite R-2170", a composition containing 75% solids. Others include "SRF 1524" from Schenectady Chemicals, "R-2200" from Koppers Company and "Arofene 779" from Ashland Chemical Co.

It is essential that a polybutadiene polymer containing more than 95 weight percent butadiene monomer be employed in the composition of this invention. Any of a variety of butadiene polymers can be employed; preferred are those having a molecular weight ranging from about 10,000 to about 2,000,000. Such polybutadiene latices are commercially available from Firestone under the designation "SR-5841", "FSR-272" and "SR-6610". The latter is a carboxylated butadiene formed of a small amount (of the order of about 4%) of acrylic acid. It has been found in this regard that small amounts of other materials, that is less than 5% by weight based upon the polymer, of vinyl monomers do not adversely affect the desirable characteristics of the butadiene component of the polymer.

The wax emulsion employed in the practice of this invention can be an emulsion of the type described in U.S. Pat. No. 3,787,224. The wax can either be a microcrystalline paraffin wax or a blend of 75% by weight paraffin wax and about 25% by weight microcrystalline wax. Suitable wax emulsions are marketed by General Latex and Chemical Corp. under the trade name "Vultex" such as "Vultex Wax Emulsion No. 9" and "Vultex Wax Emulsion No. 15".

The relative proportions of the components of the impregnating composition of the invention can be varied within relatively wide limits. In general, the vinyl pyridine copolymer latex is employed in an amount within the range of about 10–60% by weight, the polybutadiene latex in an amount within the range from about 30–80% by weight, the microcrystalline paraffin wax emulsion in an amount within the range of about 2–10% by weight and the resorcinol-aldehyde resin in an amount within the range of about 2–10% by weight.

The impregnating composition of this invention is preferably applied to bundles of glass fibers which have previously been sized with a thin film or size coating to impart lubricity to the glass fiber surfaces and thereby protect the glass fibers from destruction through mutual abrasion. Impregnation is preferably carried out in accordance with the technique described in U.S. Pat. No. 3,787,224, where the bundle of glass fibers is immersed in the impregnating composition and then subjected to a sharp bend while immersed in the impregnating composition. The bending of the bundle operates to open the bundle and thereby permit the solids of the impregnating composition to completely penetrate the bundle of glass fibers. In the final impregnated bundle, the solids of the impregnating composition thus serve to fill the interstices among the glass fiber filaments and separate the glass fibers each from the other, thereby serving to cushion the glass fibers and form a unitary bundle structure.

In fabricating glass fiber-reinforced elastomeric products, bundles of glass fibers treated in accordance with the present invention are mixed with an elastomeric material or otherwise laid down in the desired arrangement for combination with the elastomeric material, as in the manufacture of glass fiber-reinforced belts or rubber tires. The combination of glass fibers and elastomeric material is then processed in a conventional manner by molding and curing under heat and pressure while the elastomeric material is in combination with the treated glass fibers. The impregnated bundle of glass fibers thus becomes strongly integrated with the elastomeric material; the latter constitutes a continuous phase in which the glass fibers are distributed.

The term "glass fibers", as used herein, is intended to refer to and include (1) continuous fibers formed by the rapid attenuation of streams of molten glass and to strands formed when such continuous glass fiber filaments are gathered together in forming; and to yarns and cords formed by plying and/or twisting a number of strands together, and to woven and nonwoven fabrics which are formed of such glass fiber strands, yarns or cords, and (2) discontinuous fibers formed by high pressure steam or air or other attenuating force directed angularly downwardly onto multiple streams of molten glass issuing from a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

As used herein, the term "elastomer" is intended to mean and include natural rubber in the cured or uncured stage, vulcanized or unvulcanized stage, and synthetic organic elastomeric materials such as nitriles, acrylics and esters and particularly copolymers of butadiene with these and terpolymers thereof with styrene and synthetic rubber as represented by butadiene polymers and copolymers with mono-olefins such as butadiene-styrene copolymer, butadiene-acrylonitrile copolymers, butadiene-styrene vinyl pyridine terpolymers, chloroprene, isoprene, neoprene, isobutyl rubber and the like, elastomeric polymers and copolymers in their cured or uncured stages, and vulcanized or unvulcanized stages. Included also are the EPDM rubbers, such as formed by the interpolymerization of ethylene, an alpha-mono-olefin having from three to twenty carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from two to twelve carbon atoms, and polysulfone rubbers.

Having described the basic concepts of the present invention, reference is now made to the following examples which are provided by way of illustration, and not by way of limitation, of the practice of the invention in formulating impregnating compositions and their use in the treatment of glass fibers as reinforcement of elastomeric materials.

EXAMPLE 1

This example illustrates an impregnating composition embodying the features of the present invention.

An impregnating composition is formulated, using the preparation procedure described in Example 1 of U.S. Pat. No. 3,787,224, as follows.

|  | Parts by Weight |
| --- | --- |
| Butadiene-vinyl pyridine Copolymer latex (Firestone SR-6600) (41% by weight solids) | 334 |
| Wax emulsion (Wax Emulsion No. 15) | 99 |
| Butadiene polymer (Firestone SR-6610–50% solids by weight) | 1333.1 |
| Resorcinol-formaldehyde resin (SFR 1524) | 61.6 |
| Ammonium Hydroxide | 18.8 |
| Deionized Water | 132.2 |
| Formaldehyde (37% solution) | 18.4 |
| KOH (50% solution) | 3.6 |

The resulting impregnant is found to have a pH of 9.8, a viscosity (at 25° C.) of 840 cps, and a total solids content of 43.8% solids by weight.

The impregnating composition is then employed in the impregnation of tire cord which is cured in an oven at 610° F. after impregnation, at a speed of 500 ft./min. The resulting tire cord is found to have a tensile strength of 68.6 lbs., and a hot U adhesion value of 31 lbs. The loss on ignition is 16.6%.

EXAMPLE 2

This example illustrates the use of other vinyl pyridine polymers in which the weight ratio of solids of the vinyl pyridine polymer used in Example 1 to solids of the butadiene polymer is 0.41:1.

An impregnating composition is formulated as follows.

|  | Parts by Weight |
| --- | --- |
| Vinyl pyridine-butadiene copolymer (41% solids) | 350 |
| Wax emulsion | 100 |
| Butadiene polymer (Firestone FRS-272 - 50% solids by weight) | 700 |
| Resorcinol-formaldehyde resin | 65 |
| Ammonium hydroxide | 19 |
| Formaldehyde | 18.4 |
| KOH (50% solution) | 4 |
| Deionized water | 140 |

In each case, the various impregnating compositions are employed in the impregnation of tire cord which are then tested in the manner described in Example 1.

Again, good results are obtained.

It will be understood that various changes and modifications can be made in the details of procedure, formulation and use without departing from the spirit of the invention, especially as defined in the following claims.

We claim:

1. An impregnating composition for use in treating glass fibers consisting essentially of a stable aqueous dispersion of (1) a resorcinol-aldehyde resin, (2) a butadiene polymer containing more than 95 weight percent butadiene, (3) a microcrystalline paraffin wax, and (4) a copolymer formed of 70-95% by weight butadiene and 5-30% by weight vinyl pyridine.

2. A composition as defined in claim 1 wherein the resorcinol-aldehyde resin is a condensation resin formed by reaction of resorcinol with a lower aliphatic aldehyde.

3. A composition as defined in claim 1 wherein the butadiene polymer is a polymer having a molecular weight ranging from about 10,000 to about 2 million.

4. A composition as defined in claim 1 wherein the microcrystalline paraffin wax is a blend of paraffin wax and a microcrystalline wax.

5. A composition as defined in claim 1 wherein the butadiene-vinyl pyridine copolymer is formed of 80-95% by weight butadiene and 5-20% by weight vinyl pyridine.

6. A composition as defined in claim 1 wherein the butadiene-vinyl pyridine copolymer latex constitutes from 10-60% by weight of the composition, the butadiene polymer latex constitutes from 30-80% by weight of the composition, the wax as an emulsion constitutes from 2-10% by weight of the composition and the resorcinol-aldehyde resin constitutes about 2-10% by weight of the composition.

7. A bundle of glass fibers treated with the impregnating composition of claim 1.

8. A reinforced elastomeric product wherein at least one bundle of glass fibers according to claim 7 is dispersed as reinforcement in an elastomeric material.

* * * * *